(12) United States Patent
Iwrey et al.

(10) Patent No.: US 10,921,109 B2
(45) Date of Patent: Feb. 16, 2021

(54) SELF-CALIBRATING SENSOR FOR SIMULTANEOUS MEASUREMENT OF RUB DEPTH AND RUNNING CLEARANCE IN A JET ENGINE

(71) Applicants: Rolls-Royce North American Technologies Inc., Indianapolis, IN (US); Rolls-Royce Corporation, Indianapolis, IN (US)

(72) Inventors: Benjamin M. Iwrey, Indianapolis, IN (US); Kerry A. Wiegand, Brownsburg, IN (US)

(73) Assignees: Rolls-Royce North American Technologies Inc., Indianapolis, IN (US); Rolls Royce Corporation, Indianapolis, IN (US)

( * ) Notice: Subject to any disclaimer, the term of this patent is extended or adjusted under 35 U.S.C. 154(b) by 383 days.

(21) Appl. No.: 15/958,899

(22) Filed: Apr. 20, 2018

(65) Prior Publication Data
US 2019/0323818 A1   Oct. 24, 2019

(51) Int. Cl.
*G01B 7/14* (2006.01)
*B64C 27/46* (2006.01)
(Continued)

(52) U.S. Cl.
CPC .............. *G01B 7/10* (2013.01); *B64C 27/463* (2013.01); *G01B 7/14* (2013.01); *G01B 7/26* (2013.01)

(58) Field of Classification Search
CPC ... G01B 7/10; G01B 7/06; G01B 7/26; G01B 7/14; B64C 27/463; F05D 2270/821; F05D 2270/80; F05D 2260/80; F01D 21/003
See application file for complete search history.

(56) References Cited

U.S. PATENT DOCUMENTS

2003/0020496 A1   1/2003   Eyraud et al.
2003/0222640 A1   12/2003  Twerdochlib et al.
(Continued)

OTHER PUBLICATIONS

Fabian, Tibor, et al., "Capacitive Sensor for Active Tip Clearance Control in a Palm-Sized Gas Turbine Generator," IEEE Transactions on Instrumentation and Measurement, vol. 54, No. 3, Jun. 2005 (12 pages).

(Continued)

*Primary Examiner* — Amy He
(74) *Attorney, Agent, or Firm* — Barnes & Thornburg LLP

(57) ABSTRACT

A sensor simultaneously determines a maximum rub depth and running clearance of a plurality of blade tips in a jet engine. The sensor includes an inductive component (e.g. inductor) and a resistive component comprising resistor portions each indicative of a depth into a layer of abradable material near the blade tips. When the blade tips move in proximity to the inductor, eddy currents in the blades generates a magnetic field that interact with the magnetic field generated by the inductor, which appears as an AC component in the current. When the blade tips abrade the abradable material, the resistor portions are severed and the DC current changes due to a change in resistance at the resistive component. An amplitude of the AC component indicates a running clearance as the blades move in proximity to the inductor. The frequency of the AC component indicates the rotational speed of the blades.

18 Claims, 8 Drawing Sheets

(51) Int. Cl.
G01B 7/06 (2006.01)
G01B 7/26 (2006.01)

(56) References Cited

U.S. PATENT DOCUMENTS

| | | |
|---|---|---|
| 2005/0218887 A1 | 10/2005 | Twerdochlib |
| 2005/0287386 A1 | 12/2005 | Sabol et al. |
| 2006/0056960 A1* | 3/2006 | Sabol ............... F01D 25/24 415/118 |
| 2007/0063712 A1 | 3/2007 | Crum et al. |
| 2009/0243585 A1 | 10/2009 | Andarawis et al. |
| 2009/0289620 A1 | 11/2009 | Suckling et al. |

OTHER PUBLICATIONS

Barranger, John P., "Low Cost FM Oscillator for Capacitance Type of Blade Tip Clearance Measurement System," National Aeronautics and Space Administration, NASA Technical Paper 2746, Jul. 1987 (16 pages).

Du, Li, et al., "A High Sensitivity Inductive Sensor for Blade Tip Clearance Measurement," Smart Materials and Structures, Smart Mater. Struct. 23, IOP Publishing, Jun. 2014 (10 pages).

* cited by examiner

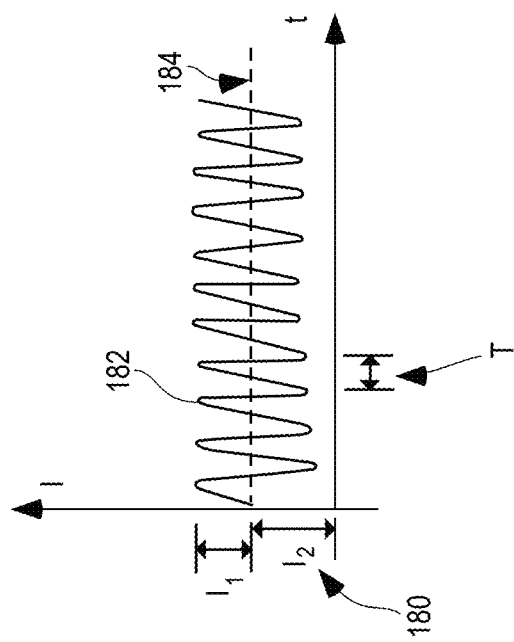
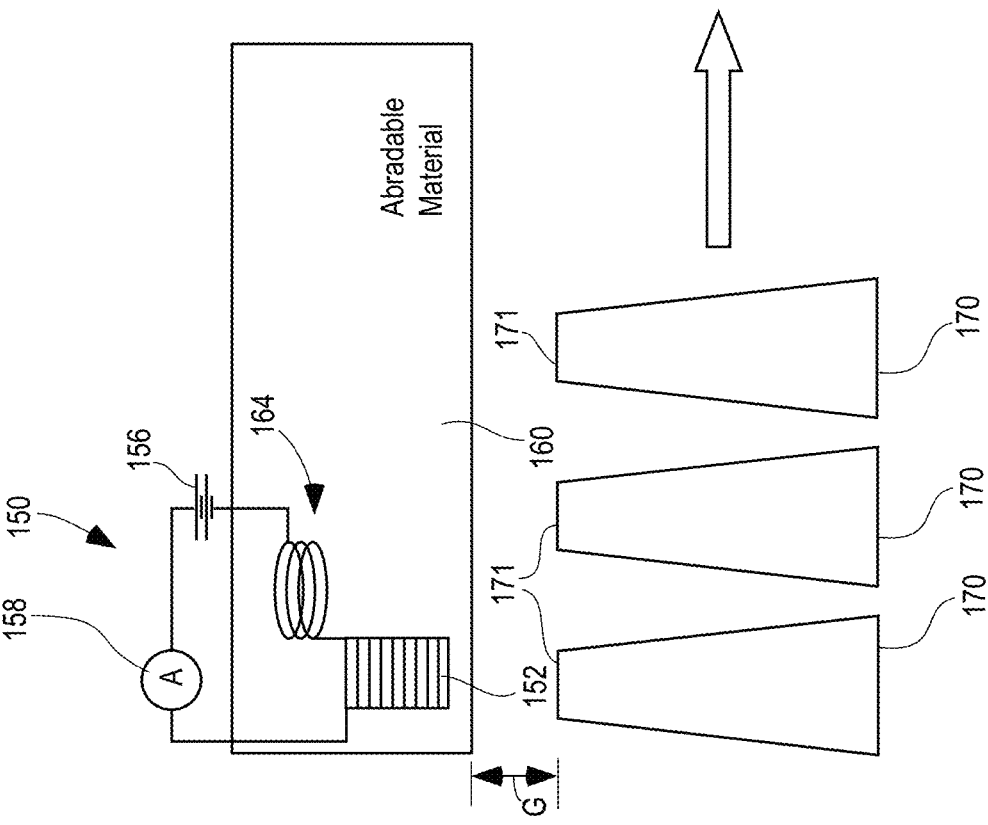

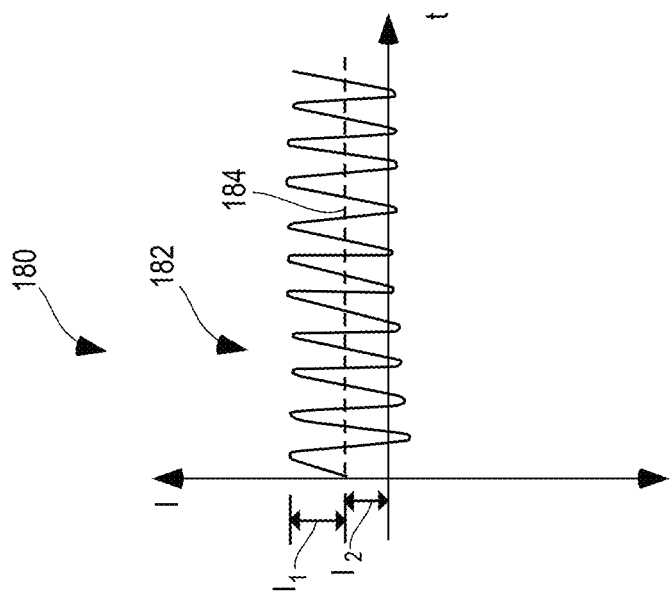
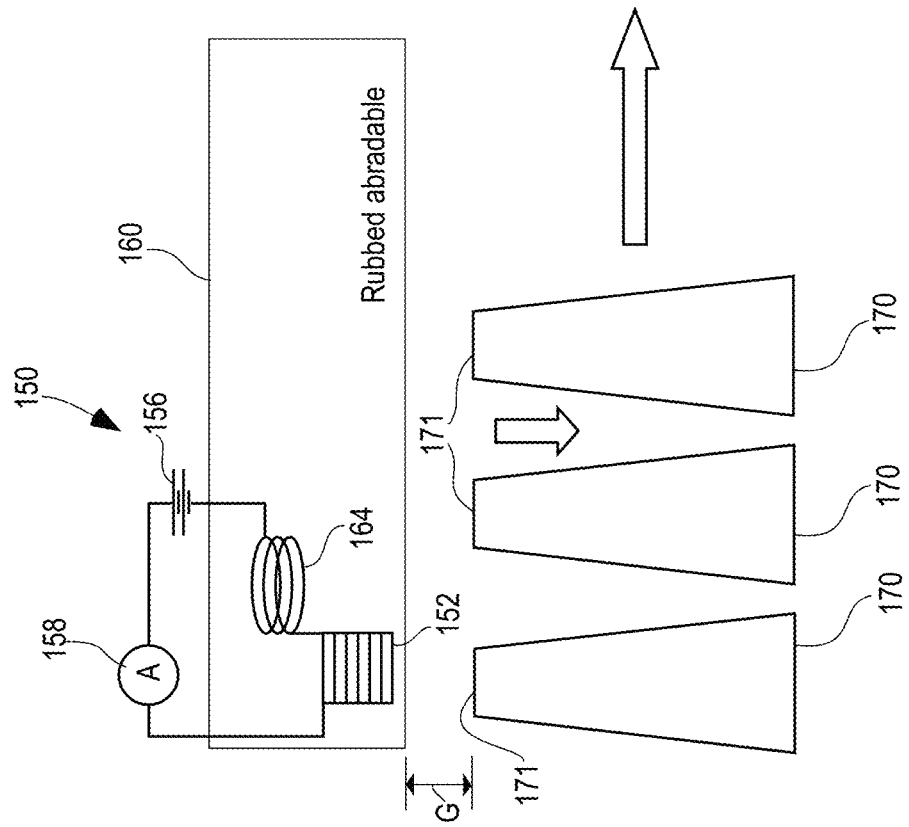

SELF-CALIBRATING SENSOR FOR SIMULTANEOUS MEASUREMENT OF RUB DEPTH AND RUNNING CLEARANCE IN A JET ENGINE

FIELD OF DISCLOSURE

The present invention relates to apparatuses and systems for detecting clearance in a jet engine, and more particularly, for simultaneously measuring rub depth in the jet engine casing and the running tip clearance.

BACKGROUND

Jet engines operate by forcing a fluid, such as a gas, through the engine to propel the structure attached to the engine through the fluid. The process of forcing the fluid through the engine typically involves the use of fans, compressors, and turbines rotating on a shaft that extends axially through the engine. In each stage of the engine, various flow paths of gas are formed to provide either power or cooling as needed.

The blades of the fans, compressors, and turbines extend from a shaft and form a gap between the blade tips and a surface of an inner lining of the casing of the engine. The gap between blade tips and casing do not provide an airflow that contributes to either power or cooling. It is desirable to limit the size of the gap between the blade tips and the casing.

Limiting the size of the blade tip gap, or blade tip clearance, is complicated by the fact that it varies during the operation of the engine as well as over time with usage of the engine. In some example jet engines, during startup of the engine for the first time, the blades extend radially until the blade tips contact the lining of the casing. The lining is typically designed to abrade with contact with the blade tips to form the gap between the blade tips and the casing lining. The abrasion of the lining results in a self-minimizing gap as the jet engine continues to run during its first startup. As noted above, the blade tip clearance varies due to the variation of the extent to which the blade tips extend radially from the shaft due to the rotation of the blades. Ultimately, the blade tip clearance is minimal as the jet engine is used. However, through wear and tear of the blades or other factors that may cause changes in dimensions throughout the structure of the jet engine, the blade tip clearance could change. For example, over time, the radial extent of the blade tips may loosen leading to a reduction in the clearance and possible further abrasion of the lining of the casing. Knowing the blade tip clearance at any given time could provide some indication of the state of the engine and whether the engine is due for maintenance or whether the engine is becoming unsafe for operation.

The aerodynamic design point (ADP) running clearance values are typically estimated based on a combination of experience and thermomechanical analysis. The lapse in clearance values between cold build and ADP is dependent on specific running conditions, such as for example, ambient temperature, pressure, rotational speed, commanded thrust, flight maneuver, and instantaneous fuel flow, and the values are again estimated post facto, via thermomechanical analysis. One problem is such thermomechanical analysis is subject to a considerable margin of error depending on boundary conditions adopted. A direct in situ measurement would be desirable in view of this margin of error.

Attempts at providing such a direct measurement have involved the use of capacitance probes. Capacitance probes suffer from difficulty in calibrating the probes and keeping them calibrated. Capacitance probes are also rendered inoperable by contact with the blade tip and must be placed either flush with—or inboard of—the abradable surface.

SUMMARY

In view of the above, devices, systems and methods are provided to simultaneously determine a maximum rub depth and running clearance of a plurality of blade tips in a jet engine. In one aspect, a sensor includes a circuit comprising a reactive component and a resistive component comprising resistor portions each indicative of a rub depth when the resistive component is positioned in a layer of abradable material near the blade tips. The sensor may include a power source, or a power input connected to receive DC current from a power source to power the circuit. The sensor may also include a signal measurement device, or a sensor output connected to provide a current signal from the circuit to a signal measurement device, where the signal measurement device is configured to generate an indication of the current signal. The reactive component generates an AC component in the current when the blade tips move in proximity with the reactive component. The resistor portions are severed when the blade tips rub into the abradable material. The DC current changes due to a change in resistance at the resistive component. An amplitude of the AC component indicates a running clearance as the blades move in proximity to the reactive component.

In another aspect, a method is provided for simultaneously determining a maximum rub depth and a running clearance between a layer of abradable material and a plurality of blade tips in a jet engine. A DC current is applied to a resistor ladder in series with a reactive component, where the resistor ladder comprises a plurality of resistors in parallel with each other and each resistor is disposed at a different depth of the layer of abradable material. A current signal is received at a signal measurement device configured to detect the current signal in the circuit. After starting operation of the jet engine, a change in rub depth is identified as a DC current level changes when one of the resistors in the resistor ladder is severed by the blade tips abrading the abradable material. A rub depth associated with each resistor being severed is indicated and the maximum rub depth is identified as being a depth corresponding to the depth of the last resistor severed by the blade tips.

Some examples of devices, systems, and methods for determining rub depth and tip clearance are outlined above rather broadly in order that the detailed description thereof may be better understood, and in order that the present contribution to the art may be better appreciated. Additional example implementations of the devices, systems, and methods are described below and will form the subject matter of the claims appended hereto. In this respect, before explaining at least one example of the devices, systems, and methods in detail, it is to be understood that the devices, systems, and methods are not limited in their application to the details of construction or to the arrangements of the components set forth in the following description or illustrated in the drawings. Other example implementations of the devices, systems, and methods may be developed, practiced and carried out in various ways. Also, it is to be understood that the phraseology and terminology employed herein are for the purpose of the description and should not be regarded as limiting.

BRIEF DESCRIPTION OF THE DRAWINGS

FIG. 3A is a schematic view of an example of a sensor disposed in an abradable material opposite a plurality of blade tips when the blade tips are starting to rotate.

FIG. 3B is a graph depicting a current signal measurement when the blade tips are starting to rotate as shown in FIG. 3A.

FIG. 6A is a schematic view of the sensor in FIG. 3A when the blade tips are moving with a running clearance between the blade tips and the abradable material.

FIG. 6B is a graph depicting the current signal measurement when the blade tips are moving at a running clearance between the blade tips and the abradable material.

DETAILED DESCRIPTION

Figure 1:
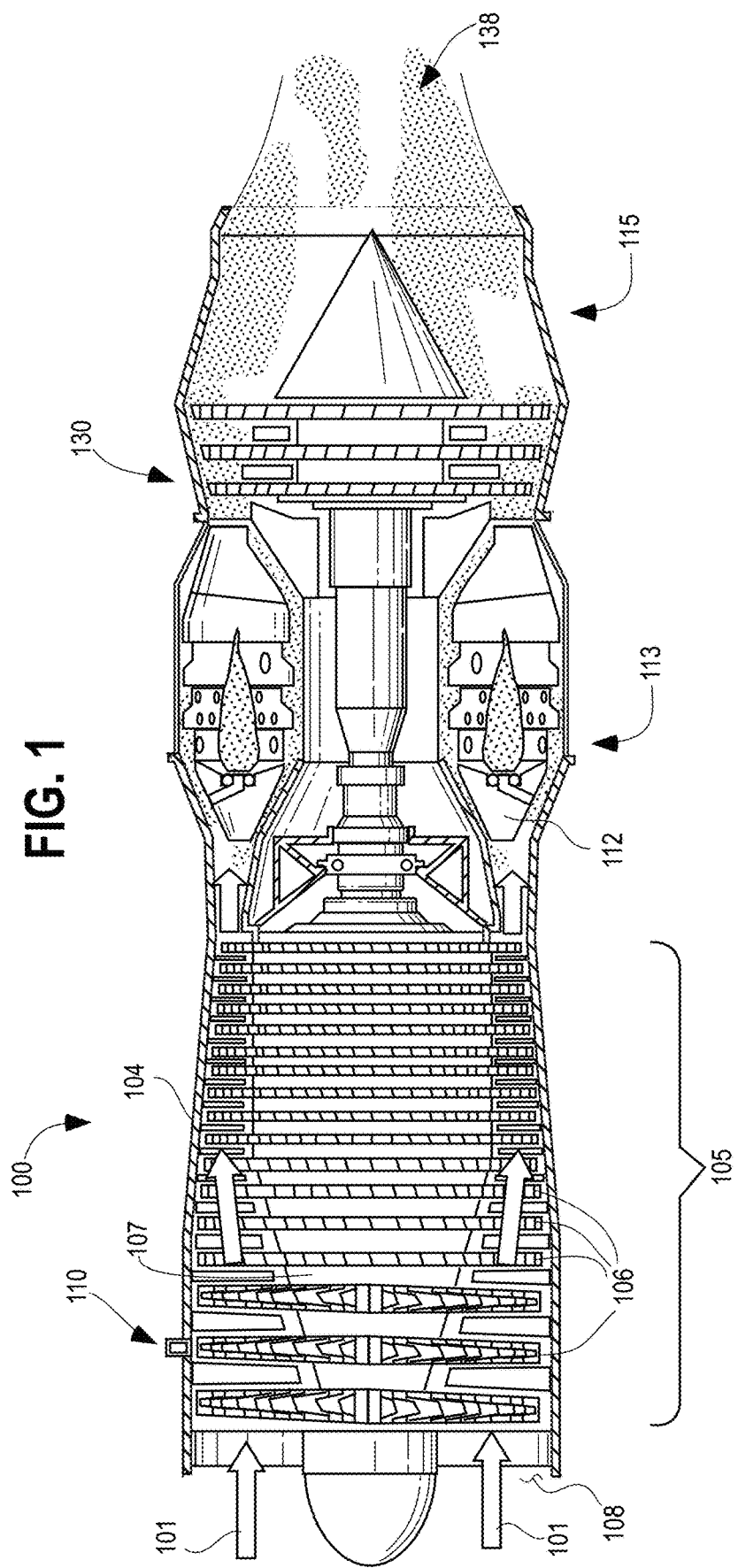
FIG. 1 is a side view of an example of a jet engine.

Disclosed herein are systems and methods for measuring a rub depth and a running blade tip clearance between a plurality of blade tips and a surrounding abradable surface lining the casing of a jet engine. In an example implementation, the sensor comprises a reactive component and a resistive component in a series connection to a power source and a signal measurement device. The resistive component comprises resistor portions positioned at a corresponding rub depth when the sensor is inserted into an abradable layer lining the casing of the engine. The resistive component may be inserted into the layer of abradable material with each resistor portion positioned at a corresponding distance from the surface of the layer of abradable material. During operation, the blade tips sever the resistor portions when rubbing the abradable layer. A change in current when a resistor portion is severed indicates the blade tips have rubbed to the rub depth corresponding to the severed resistor portion.

The reactive component generates an AC component in the current signal as the metallic blade tips move in proximity to the reactive component. As the speed of the blade tips increases, the frequency of the AC component in the current signal increases. As the blade tips approach the reactive component, the amplitude of the AC component increases. The change in DC current provides an indication of the depth to which the rubbing of the abradable material by the blade tips has reached while the amplitude and frequency of the AC component provide an indication of blade tip speed and running clearance. Typically, the blade tips rub into the abradable material during initial operation of the jet engine to create a clearance for continued operation. By providing the resistive component with resistor portions that are severed during abrasion in a manner that provides an indication of the current rub depth as well as a maximum rub depth corresponding to the last resistor portion severed before a clearance is created, the system self-calibrates for the process of detecting a running clearance and monitoring blade speed.

In an example implementation, the resistive component is a resistor ladder mounted on a substrate, such as for example, a printed circuit board, with each resistor connected in parallel and positioned a corresponding distance from a first edge of the substrate. The substrate is then inserted into the layer of abradable material with the first edge of the substrate substantially aligned with the surface of the abradable material opposite the blade tips. During operation, as the blade tips abrade the abradable material, the blade tips sever the resistors in the resistor ladder while power is applied to the resistor ladder. The severing of each resistor causes a change in current through the resistor ladder, which provides an indication of the rub depth of the blade tips. As the jet engine continues to operate, the blade tip clearance is formed and the last resistor severed provides an indication of the maximum rub depth of the blade tips into the abradable material.

The sensor, systems and methods disclosed herein may be advantageously used in the fan or compressor stages of a jet engine. Use in the turbine stages may also be possible assuming the sensor can be designed with thermal protection to withstand the higher temperatures in the turbine section.

FIG. 1 is a side view of an example of a turbojet engine 100 comprising a sensor 110 configured to simultaneously determine maximum rub depth and running clearance of a plurality of blade tips on a corresponding plurality of compressor blades 106. The jet engine 100 in FIG. 1 includes a compressor section 105, a combustion section 113, and a turbine section 115. Other types of jet engines may include a fan section having a fan blade arrangements upstream of the compressor section. Example implementations of the sensor 110 may also be used to simultaneously monitor the maximum rub depth and running clearance for fan blade arrangements in the fan section of such engines. The compressor section 105 includes a plurality of compressor blade arrangements 106. Air 101 enters the jet engine 100 at an air inlet 108, and is forced through the compressor section 105 at least in part by the rotation of the compressor blade arrangements 106.

The combustion section 113 includes combustors 112, which heat the air flowing in the jet engine 100 towards the turbine section 115. A plurality of turbine blades 130 in the turbine section 115 of the engine 100 absorb power from the hot, high-pressure gas being discharged from the combustor, and in turn deliver power through the shaft to the compressor section 105.

During operation, the blades of any of the blade arrangements 106, 130 extend radially between a minimum and maximum radius at the blade tips depending on the rotational speed of the blades and the wear and tear of the engine over time. The varying radial extent of the blades results in a clearance between the tips of the blades and the inner surface of the casing 104 that also varies. It is desirable that this tip clearance be as small as possible since the gap provides a path for airflow that is undesirable for suitable performance of the engine. One way in which the tip clearance is minimized is by lining the casing 104 with an abradable material, such as a composite material, that is allowed to be cut by the blade tips an initial or early startup of the jet engine. At some point during early operation of the jet engine, the blade tips reach a maximum depth, or maximum rub depth. When the maximum rub depth is reached, the blade tips are not expected to continue to rub the abradable material. In addition, a minimum tip clearance has been formed by the manner in which the blade tips cut their own clearance in operation.

Over time, the radius to which the blade tips extend can vary due to wear and tear in the way tolerances in other areas of the jet engine can also vary over time. The jet engine 100 in FIG. 1 includes a sensor 110 embedded in the abradable lining of the casing 104 to monitor the formation and the variation of the blade tip clearance over time. The sensor 110 in FIG. 1 is positioned in proximity to the blade tip of the second blade of the compressor blade arrangement 106. The sensor 110 may also be positioned in proximity to any of the other compressor blades, or all of the compressor blades 106. In embodiments of the sensor 110 made to operate to operate in the intense heat generated in the turbine section 113, the sensor 110 may be positioned in proximity to the blade tips of turbine blades. Example implementations of sensors configured to monitor a running clearance for multiple blade arrangements and/or multiple positions around an individual blade arrangement are described below with reference to FIGS. 7A-8B.

Figure 2:
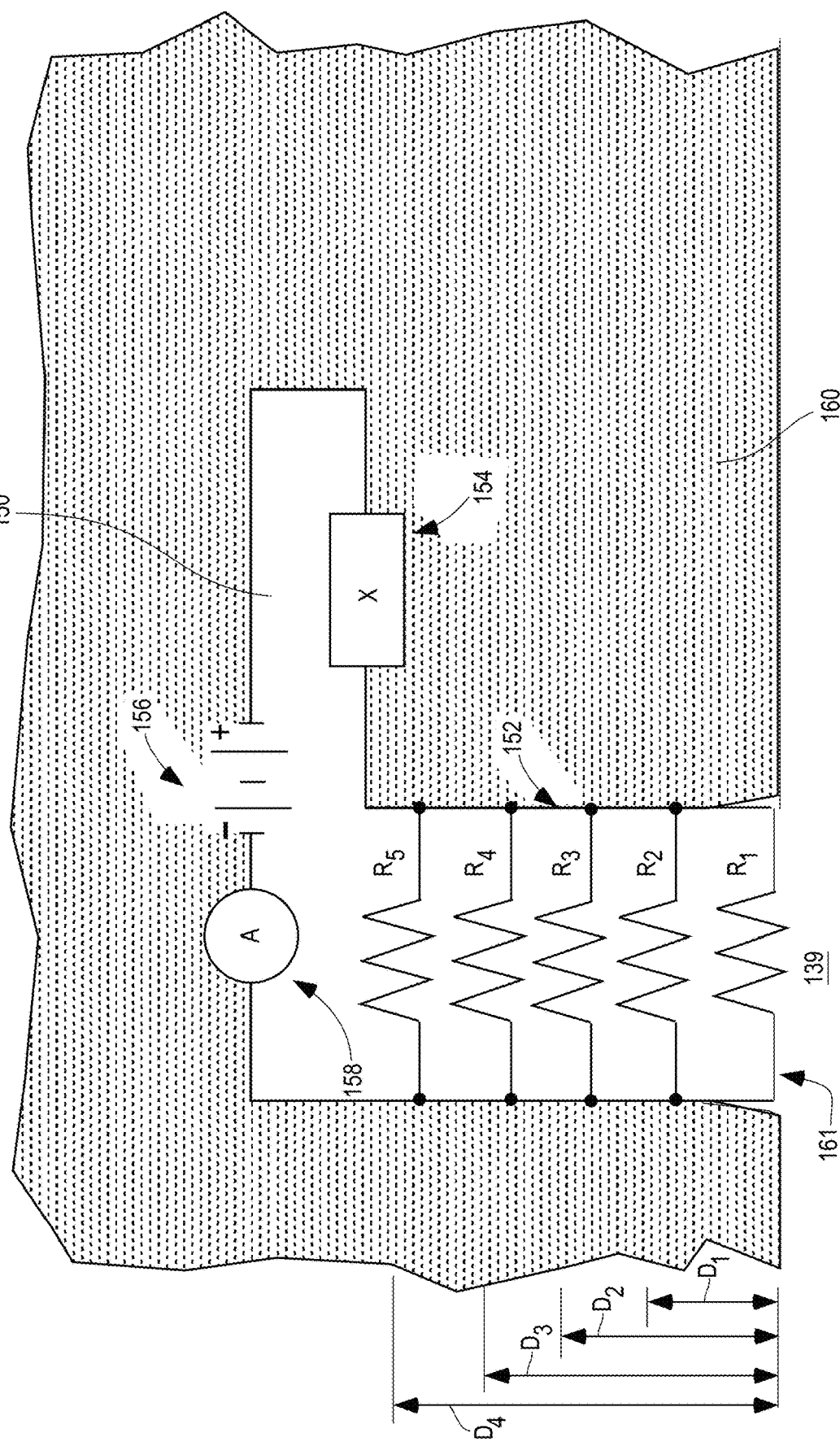
FIG. 2 is a schematic circuit diagram of an example of a sensor for monitoring a running clearance between blade tips and an abradable lining in a jet engine.

FIG. 2 is a schematic diagram of an example of a sensor 150 embedded in an abradable lining 160 of the casing 104 (in FIG. 1) of a jet engine. The sensor 150 in FIG. 1 includes a resistive component in the form of a resistor ladder 152 formed with a plurality of resistor portions, or simply resistors R as shown in FIG. 1. The resistance of the resistor ladder 152 may be the same value, or any other suitable value. The resistor ladder 152 in FIG. 1 is in series connection with a reactive component 154, a power source 156, and a signal measurement device 158. The reactive component 154 used in the examples described herein is an inductor, however, any other suitable reactive component may be used, particularly a reactive component having an inductance.

The power source 156 may be a DC power source, or a battery, capable of generating a low power signal in the range of several millivolts to tens of volts. The power source 156 should be capable of generating a DC current in in the resistor ladder 152 and inductor 154 that can be measured by the signal measurement device 158.

The signal measurement device 158 may be any meter, such as a current meter or a voltage meter that also detects AC components in a signal. The signal measurement device 158 is configured to measure a DC current, an AC frequency, and an AC amplitude, preferably on a continuous basis. The signal measurement device 158 may incorporate analog to digital conversion components and may also be in communication with other computer systems configured to receive the DC current signals, the AC frequencies, and the AC amplitudes detected by the signal measurement device 158 and to process the measurements to simultaneously determine a rub depth of the blade tips in the abradable material, a blade speed, and a running clearance of the gap between the tips and the abradable material 160.

As noted, the reactive component 154 is any reactive component that has an inductance. In the descriptions below, the reactive component 154 shall be referred to as an inductor, a solenoid-inductor or a reactive component. When power is applied to the circuit by the power source 156, the inductor 154 generates a magnetic field in a manner that is well known in the art. As the blade tips move in proximity to the inductor 154, eddy currents are formed in the blades. As the blades pass in and out of the magnetic field, the change in eddy currents induces a changing magnetic field, which then interacts with the magnetic field initially generated by the inductor 154. The time-varying change in the total magnetic field generated by the inductor 154 produces a time-varying current signal, which is then measured as the AC component in the current signal as described in more detail below with reference to FIGS. 3 through 6. The frequency of this AC component is indicative of the rotational speed of the blades and the amplitude of the AC component is indicative of the distance between the blade tips and the inductor 154. The different signal characteristics and the manner in which each is interpreted are summarized below in Table A.

TABLE A

| AC or DC Component | Attribute | Interpretation | Notes |
|---|---|---|---|
| DC | Amplitude | Maximum rub depth, remaining abradable | Resistance and impedance change as rungs are severed. |
| AC | Amplitude | Blade to inductor distance and rotational speed. | |
| AC | Frequency | Rotational Speed | |

The sensor 150 in FIG. 2 may be formed on a substrate, such as a printed circuit board, for example. The substrate would include, at least, the resistor ladder 152 and the inductor 154. The power source 156 and the signal measurement device 158 may also be mounted on the substrate. The components on the substrate may be positioned so that a first one of the resistors, R, in the resistor ladder 152 is disposed on or near a first substrate edge 161, and the substrate inserted into the abradable material 160 with the first substrate edge 161 either substantially aligned or at a known distance away from the surface of the abradable material 160 across a clearance gap 139 from a plurality of blade tips. Each next resistor R in the resistor ladder 152 may then be positioned a known distance perpendicular to the first substrate edge 161 from each previous resistor starting with the first resistor R.

The resistor ladder 152 in FIG. 3 comprises five resistors, $R_1$, $R_2$, $R_3$, $R_4$, and $R_5$. $R_1$ is positioned so that it is substantially aligned with the substrate surface edge 161 and the surface of the abradable layer 160. Resistor $R_2$ is positioned a known distance $D_1$ from the first substrate edge 161. Resistor $R_3$ is positioned a known distance $D_2$ from the first substrate edge 161. Resistor $R_4$ is positioned a known distance $D_3$ from the first substrate edge 161. Resistor $R_5$ is positioned a known distance $D_4$ from the first substrate edge 161.

When the blade tips begin to abrade the abradable material 160, the first resistor $R_1$ is severed. The drop in the DC current level through the resistor ladder 152 is detected and processed to indicate that the blade tips have begun to abrade the abradable material 160. The severing of the next resistor $R_2$ by the blade tips is detected by the subsequent drop in current through the resistor ladder 152 and processed to indicate that the blade tips have begun to abrade the abradable material 160 at a depth of $D_1$. A maximum rub depth has been reached when the resistors in the resistor ladder 152 are no longer getting severed, which is indicated by detection of a substantial period of time at which the DC current level does not change substantially.

It is noted that the example sensor in FIG. 2 is illustrated schematically, and while the resistive component in the example shown in FIG. 2 is a resistor ladder formed as a plurality of resistors connected in parallel, the resistive component may take other forms. For example, a layer of material having a resistance over an area may be disposed in the abradable material 160 such that sections of the layer of resistive material correspond to a rub depth within the abradable material 160. As the abradable material is rubbed, sections of the layer of resistive material is rubbed off causing a change in total resistance of the layer of resistive material.

The inductor 154 may be mounted on the substrate. Whether on a substrate or not, the inductor 154 should be positioned so that the resistor ladder 152 is between the inductor 154 and the surface of the abradable material 160. One of the parameters monitored by the sensor 150 is the distance between the blade tips and the inductor 154. The inductor 154 should therefore be placed where the blade tips would not make contact with it except in a catastrophic event. The inductor 154 should however be positioned close enough enough so that the electromagnetic interaction between the inductor 154 and the blade tips 171 is strong enough to generate a robust and meaningful AC signal.

The sensor 150 may comprise a substrate for a circuit made up of only the resistive component, or only the resistive component and the inductor. The substrate would further include a power input to connect to the power source and a sensor output to connect to a signal measurement device.

FIG. 3A is a schematic view of an example of a sensor 150 disposed in an abradable material 160 opposite a plurality of blade tips 171 when the blade tips begin to rotate in the direction indicated by arrow D. During the initial operation of the engine, the blades 170 move with a clearance, G, between the blade tips 171 and the abradable material 160. The sensor 150 is also powered by the power source 156, which provides a DC signal sufficient to generate a magnetic field in an inductor 164 through which the blade tips 171 can move. The signal measurement device 158 measures the current in the circuit. The signal measurement device 158 may be equipped with a communications interface, such as a hardwired or a wireless connection to a data processing system configured to process the current signal measurements taken by the signal measurement device 158.

FIG. 3B is a graph 180 depicting a current signal measurement taken by the signal measurement device 158 when the blade tips 171 begin to rotate as shown in FIG. 3A. The graph 180 shows the current signal level, I, over time, t. The motion of the blade tips 171 through the magnetic field generated by the inductor 164 creates eddy currents in the blades 170, which generate a second magnetic field that interacts with the first magnetic field generated by the inductor 164. The interaction between the first and second magnetic fields appears as an AC waveform 182 having an amplitude $I_1$ and a frequency, f=1/T. The AC waveform has a DC offset indicated by a current level, $I_2$ at 184. Without the AC component 182, the current signal would simply be a constant current at current level $I_2$.

Figure 4B:
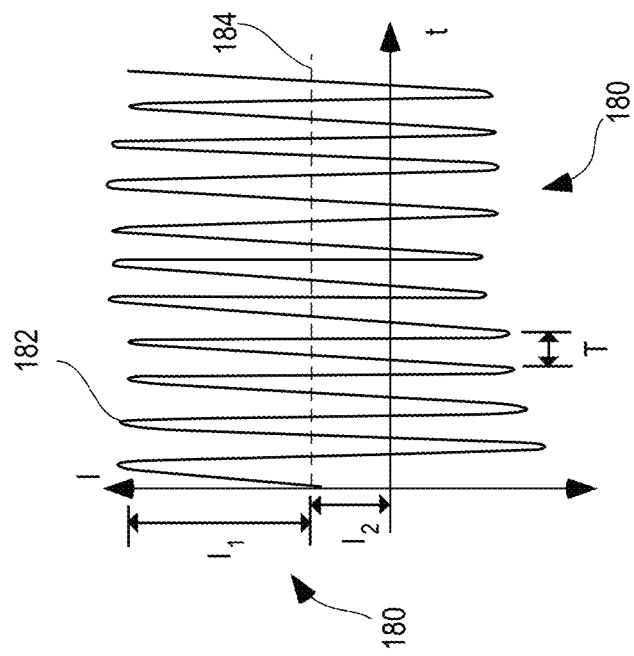
FIG. 4B is a graph depicting a current signal measurement when the instantaneous tip clearance changes.
Figure 4A:
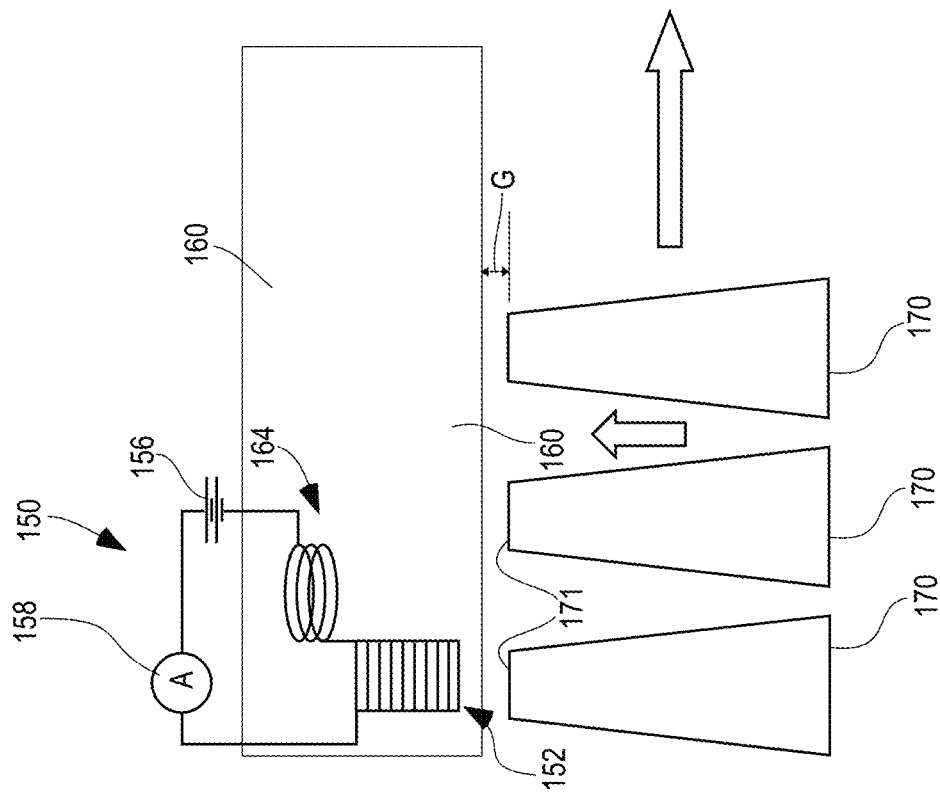
FIG. 4A is a schematic view of the sensor in FIG. 3A when the instantaneous tip clearance changes.

As noted above, the motion of the blades 170 generates the AC waveform 182 at a frequency, f, corresponding to the speed of the blades 170, and an amplitude, $I_1$, corresponding to the proximity of the blade tips 171 to the inductor 164 as well as the rotational speed of the blades 170. FIG. 4A is a schematic view of the sensor in FIG. 3A when the speed of rotation of the blade tips begins to increase. As the speed of the blades 170 increases, the radial extent of the blade tips 171 increases thereby reducing the clearance G between the blade tips 171 and the surface of the abradable material 160. FIG. 4B is a graph 180 depicting the current signal measurement when the speed of rotation of the blade tips 171 begins to increase. The increase in speed of the blades 170 is indicated by the higher frequency (or the shorter period T) of the AC component 182. The amplitude $I_1$ of the AC component 182 is also greater than the amplitude $I_1$ in the graph 180 in FIG. 3B indicating closer proximity between the blade tips 171 and the inductor 164. The DC current level $I_2$ has not changed indicating that the resistor ladder 152 has not been affected by the motion of the blade tips 171.

Figure 5B:
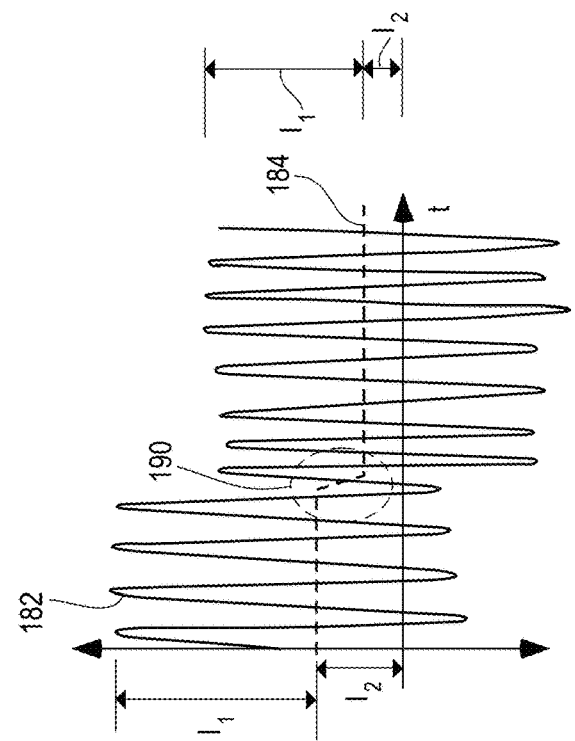
FIG. 5B is a graph depicting a current signal measurement when the rotation of the blades has extended the blade tips radially to the extent that the blade tips have begun abrading the abradable surface.
Figure 5A:
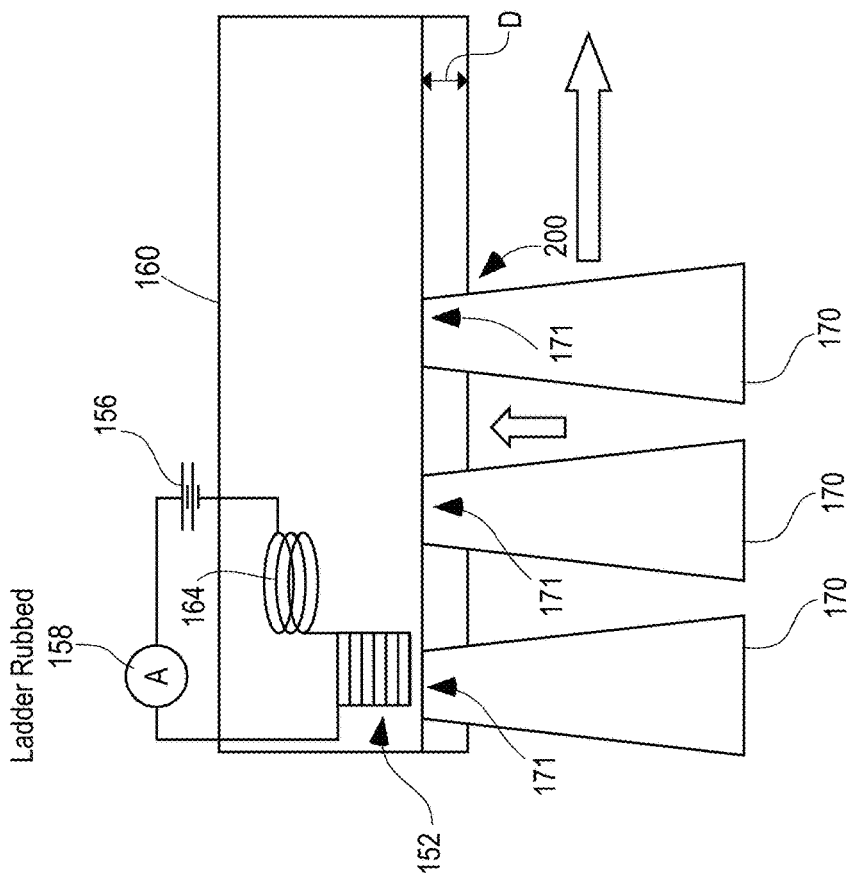
FIG. 5A is a schematic view of the sensor in FIG. 3A when the rotation of the blades has extended the blade tips radially to the extent that the blade tips have begun abrading the abradable surface.

FIG. 5A is a schematic view of the sensor 150 in FIG. 3A when the rotation of the blade tips 171 has extended the blade tips 171 radially to the extent that the blade tips 171 have begun abrading the abradable material 160. The blade tips 171 have rubbed into the abradable material to a depth D, which is shown as sufficient to have severed some of the resistors in the resistor ladder 152. The severing of any of the resistors in the resistor ladder 152 changes the total resistance across the resistor ladder 152 to a higher resistance. FIG. 5B is a graph 180 depicting the current signal measurement when the rotation of the blade tips 171 has extended the blade tips 171 radially as described with reference to FIG. 5A. The graph 180 includes a current step change 190 indicating a change in current level from $I_2$ to $I_2'$, a current that is lower than the current level $I_1$ due to the increase in resistance across the resistor ladder 152 caused by the severing of some of the resistors.

When a severing of a resistor is detected by the detection of the current step change 190 in the current signal measurement, a data processing system monitoring the current signal measurement determines the rub depth as being the depth corresponding to the severed resistor. The data processing system may determine the corresponding depth by tracking each resistor severed and setting a rub depth corresponding to each severed resistor. In an example implementation in which the resistors in the resistor ladder 152 have substantially the same resistance value and the resistors are positioned an equal distance from each other in the resistor ladder 152, the data processing system may use the detected current levels to determine the resistance value of the resistor ladder 152. As the blade tips 171 sever resistors, the change in the resistance of the resistor ladder 152 corresponds to the depth to which the blade tips 171 have rubbed into the abradable material 160.

The rubbing of the blade tips 171 in the abradable material 160 is part of the process of creating a running clearance in further operation of the jet engine. Operation continues at normal rotational speeds of the blades 170 with a minimum clearance between blade tips 171 and the abradable material 160. During the process of creating the running clearance and the resistors in the resistor ladder 152 are severed, the AC component amplitude $I_1$ is also monitored. The values of the AC component amplitude $I_1$ are matched to the rub depth corresponding to the severed resistor(s). The matching of the rub depth with the measured AC component amplitude $I_1$ effectively calibrates the sensor 150 so that the AC component amplitude $I_1$ provides an accurate measure of the running clearance.

FIG. 6A is a schematic view of the sensor 150 in FIG. 3A when the blade tips 171 are moving with a running clearance G between the blade tips 171 and the abradable material 160. The running clearance G is the distance between the blade tips 171 and abradable material 160 during operation of the jet engine after the running clearance has been created by the process of abrading the abradable material with the blade tips 171. The blades 170 should rotate in the jet engine without a substantial deviation from the running clearance during the operational lifetime of the jet engine. The running clearance G may be monitored by monitoring the AC component amplitude $I_1$. The rotational speed of the blades 170 may also be monitored by monitoring the frequency of the AC component of the current signal. FIG. 6B depicts a current signal measurement when the blade tips 171 are moving at a running clearance. The AC component amplitude $I_1$ should remain substantially at the same level through the lifetime of the jet engine with normal variations related to the rotational speed of the blades 170. The AC component amplitude, the AC component frequency, and the DC current level can be continuously monitored throughout the lifetime of the jet engine to detect anomalies that may indicate potential problems with the jet engine. For example, a substantial deviation of the AC component amplitude $I_1$, particularly an increase in the amplitude, may indicate a problem with the blades 170 or with the structure in the jet engine that keeps the blades 170 attached to the rotor or shaft. A step change in the DC current level may result if the blade tips 171 breach the running clearance and begin to abrade the abradable material 160 sufficiently to sever another resistor. After a running clearance is created, the blade tips 171 should not further abrade the abradable material 160 and should not sever any more resistors in the resistor ladder.

Figure 7B:
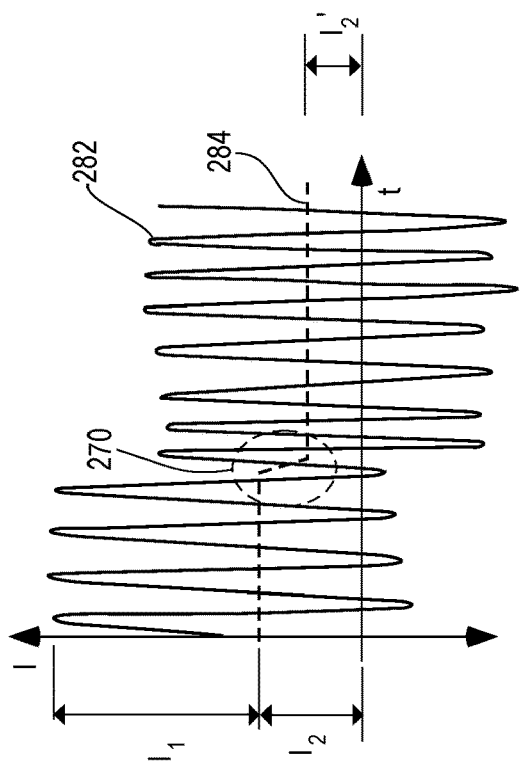
FIG. 7B is a graph depicting the current signal measurement when the rotation of the blade tips has extended the blade tips radially to the extent that the blade tips have begun abrading the abradable surface.
Figure 7A:
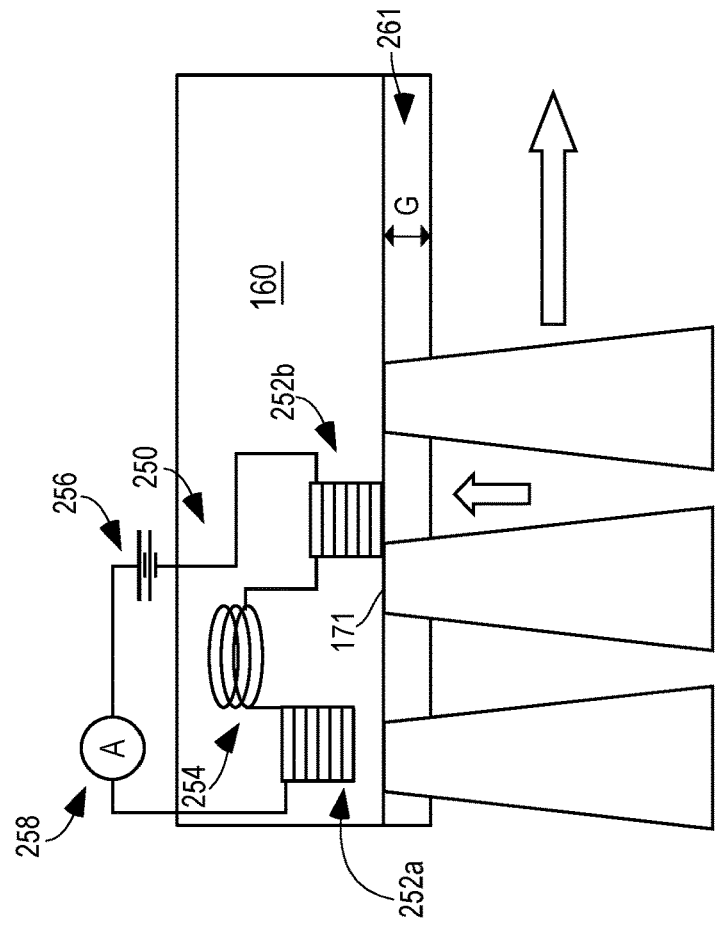
FIG. 7A is a schematic view of another example of a sensor disposed in an abradable material opposite a plurality of blade tips when the rotation of the blade tips has extended the blade tips radially to the extent that the blade tips have begun abrading the abradable surface.

FIG. 7A is a schematic view of another example of a sensor 250 disposed in an abradable material 160 opposite a plurality of blade tips 171 when the rotation of the blade tips 171 has extended the blade tips 171 radially to the extent that the blade tips 171 have begun abrading the abradable material 160. The sensor 250 includes multiple resistor ladders 252a, 252b in series with an inductive component 254, a power source 256, and a signal measurement device 258. Each of the multiple resistor ladders 252a, 252b may be placed in different locations either engine-radially so that each resistor ladder 252a, 252b monitors a running clearance for different blade arrangements. The resistor ladders 156 may also be placed engine-circumferentially to monitor a running clearance around a single blade arrangement. The resistors in each resistor ladder 252a, 252b are of a different resistor value providing an identity to each resistor ladder 252a, 252b. The sensor data processing system that detects the change in resistance (from the change in current) is able to determine which resistor ladder 252a, 252b had a resistor severed to cause the change in current.

The sensor 250 configuration in FIG. 7A simultaneously monitors a running clearance at different locations. In an implementation in which each resistor ladder 252a, 252b is placed in the abradable material 160 opposite a different blade arrangement, the sensor 252 simultaneously monitors the running clearance for multiple blade arrangements. With each current step change in the severing of individual resistors, the sensor data processing system determines the resistor value corresponds to the current step change and identifies which blade arrangement caused the severing of the resistor during abrasion of the abradable material 160. In an implementation in which the multiple resistor ladders 252a, 252b are positioned circumferentially around one of the blade arrangements, the sensor 250 simultaneously monitors the running clearance at different positions in the abradable material 160 surrounding the blade arrangement. In another implementation, the resistor ladders 252a, 252b may be positioned at different radial positions. That is, one resistor ladder 252 may be radially more distant from the surface of the abradable material 160 than another resistor blade 256. It is noted that the example in FIG. 7A depicts two resistor ladders 252a, 252b incorporated in the sensor 250, another sensor 250 may include three, four or any number of resistor ladders.

FIG. 7B is a graph 280 depicting the current signal measurement when the rotation of the blade tips has extended the blade tips 171 radially to the extent that the blade tips have begun abrading the abradable material 160. The graph 280 includes an AC component 282 generated by the motion of the blade tips 171 moving in proximity to the magnetic field generated by the DC current flowing in the inductive component 254. The AC component 282 includes an amplitude $I_1$ and a frequency as described above with reference to FIG. 5A. The graph 280 also includes a DC component 284 representing the DC current flow provided by the power source 256. When the blade tips 171 sever one of the resistors in one of the resistor ladders 252a, 252b, the current 282 changes, which is depicted in the graph 280 as a current step change 270 from a first current level $I_2$ to a second current level $I_2'$. The difference in magnitude between $I_2$ and $I_2'$ indicates the loss of the resistance in the resistance ladder 252a, 252b when one of the resistors is severed. The sensor data processing system may detect the loss of resistance to identify which resistor ladder 252a or 252b had a resistor severed.

Figure 8B:
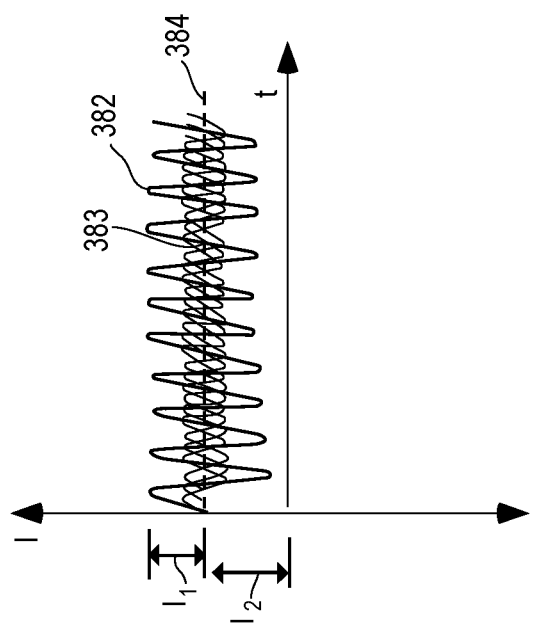
FIG. 8B is a graph depicting the current signal measurement when the blade tips are starting to rotate.
Figure 8A:
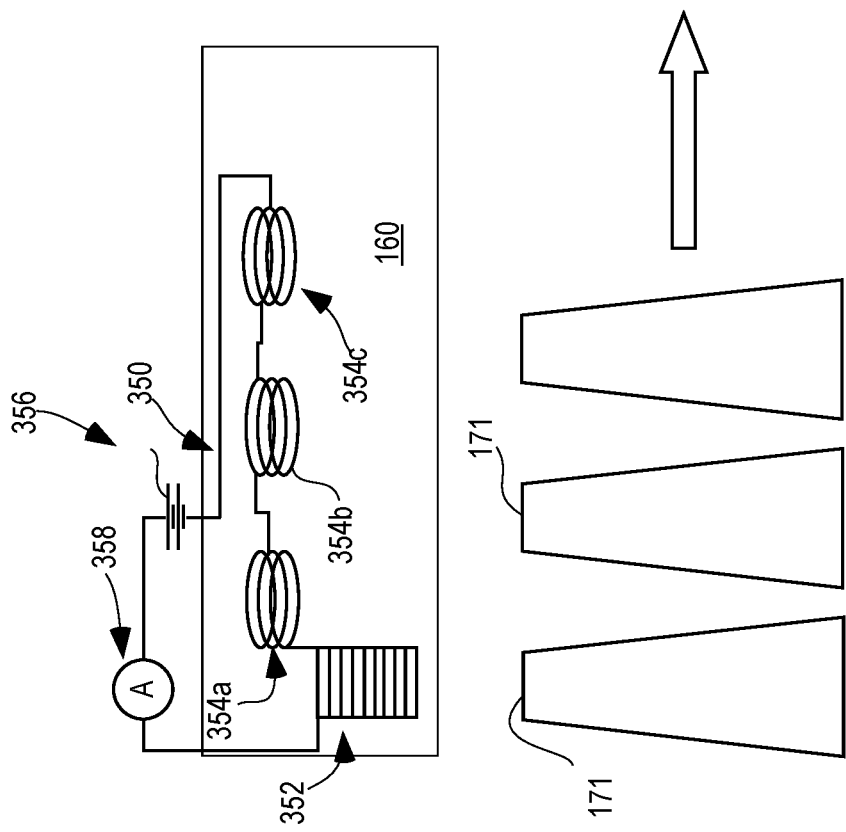
FIG. 8A is a schematic view of another example of a sensor disposed in an abradable material opposite a plurality of blade tips when the blade tips are starting to rotate.

FIG. 8A is a schematic view of another example of a sensor 350 disposed in an abradable material 160 opposite a plurality of blade tips 171 when the blade tips 171 are starting to rotate. The sensor 350 in FIG. 8A incudes multiple inductive components 354a, 354b, 354c in different locations circumferentially around a blade arrangement connected in series with a resistor ladder 352, a power source 356, and a signal measurement device 358. The multiple inductive components 354 enables effective signal amplification of the instantaneous clearance G between blade tips 171 and abradable material 160. FIG. 8B is a graph 380 depicting the current signal measurement when the blade tips 171 are starting to rotate. The graph 380 includes an AC component 282, which may be formed from the multiple weaker AC components 383 generated by each inductive element 354 in the sensor 350. The multiple inductive components 354 thus amplify an otherwise relatively weak AC component.

It is noted that example sensors may be implemented using multiple resistor ladders and multiple inductive components positioned axially at different blade arrangements and/or circumferentially around individual blade arrangements, or both axially and circumferentially.

The description in this disclosure has focused on an implementation in which the maximum rub depth and running clearance for blade tips are monitored for a radial extent of the blade tips. Example implementations of the sensors and methods described herein may also be used to monitor rub depth and running clearance in an axial direction in centrifugal compressors.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A sensor for simultaneously determining a maximum rub depth and running clearance of a plurality of blade tips in a jet engine, the sensor comprising:
   a circuit comprising a reactive component and a resistive component comprising resistor portions each indicative of a rub depth when the resistive component is positioned in a layer of abradable material near the blade tips;
   a power input connected to receive DC current from a power source to power the circuit; and
   a sensor output connected to provide a current signal from the circuit to a signal measurement device configured to generate an indication of the current signal;
   where the reactive component generates an AC component in the current when the blade tips move in proximity with the reactive component;
   where, the resistor portions are severed when the blade tips rub into the abradable material causing a change in the DC current due to a change in resistance at the resistive component, and an amplitude of the AC component indicates a running clearance as the blades move in proximity to the reactive component; and
   where the signal measurement device is configured to indicate a blade speed based on a frequency of the AC component.

2. The sensor of claim 1 where:
   the resistive component is a resistor ladder and each resistor portion is a resistor positioned to indicate the rub depth and connected in parallel with each of the other resistor portions.

3. The sensor of claim 1 where the resistive component is disposed on a substrate, and where:
   the resistive component is a resistive layer formed on the substrate and each resistor portion comprises a resistor portion of the resistive layer indicative of the rub depth when severed by the blade tips.

4. The sensor of claim 1 further comprising a substrate configured to support the circuit and to fit within the layer of abradable material perpendicular to a surface of the layer of the abradable material so that the position of each resistor portion indicates the rub depth.

5. The sensor of claim 4 where the substrate is a printed circuit board.

6. The sensor of claim 1 where:
   the reactive component is an inductor in series with the resistive component.

7. The sensor of claim 1 where the resistive component is a first resistive component, the sensor further comprising a second resistive component in series connection with the first resistive component, the inductive component, the signal measurement device, and the power source.

8. The sensor of claim 1 where the inductive component includes a first inductive component, the sensor further comprising a second inductive component in series connection with the resistive component, the first inductive component, the signal measurement device, and the power source.

9. A system for simultaneously determining a maximum rub depth and running clearance of a plurality of blade tips in a jet engine, the system comprising:
   a circuit comprising a reactive component and a resistive component comprising resistor portions each indicative of a rub depth when the resistive component is positioned in a layer of abradable material near the blade tips;
   a power source configured to provide a DC current to the circuit; and
   a signal measurement device configured to generate an indication of a current signal in the circuit;
   where the reactive component generates an AC component in the current when the blade tips move in proximity with the reactive component;
   where, the resistor portions are severed when the blade tips rub into the abradable material causing a change in the DC current due to a change in resistance at the resistive component, and an amplitude of the AC component indicates a running clearance as the blades move in proximity to the reactive component; and
   where the signal measurement device is configured to indicate a blade speed based on a frequency of the AC component.

10. The system of claim 9 where:
    the resistive component is a resistor ladder and each resistor portion is a resistor positioned to indicate the rub depth and connected in parallel with each of the other resistor portions.

11. The system of claim 9 where the resistive component is disposed on a substrate, and where:
    the resistive component is a resistive layer formed on the substrate and each resistor portion comprises a resistor portion of the resistive layer indicative of the rub depth when severed by the blade tips.

12. The system of claim 9 further comprising a substrate configured to support the circuit and to fit within the layer of abradable material perpendicular to a surface of the layer of the abradable material so that the position of each resistor portion indicates the rub depth.

13. The system of claim 12 where the substrate is a printed circuit board.

14. The system of claim 9 where:
    the reactive component is an inductor in series with the resistive component.

15. A method for simultaneously determining a maximum rub depth and a running clearance between a layer of abradable material and a plurality of blade tips in a jet engine, the method comprising:

applying a DC current to a resistor ladder in series with a reactive component, where the resistor ladder comprises a plurality of resistors in parallel with each other, each resistor disposed at a different depth of the layer of abradable material;

receiving a current signal at a signal measurement device configured to detect the current signal in the circuit;

after starting operation of the jet engine, identifying a rub depth change as a DC current level changes when one of the resistors in the resistor ladder is severed by the blade tips abrading the abradable material;

indicating a rub depth associated with each resistor being severed and the maximum rub depth as being a depth corresponding to the depth of the last resistor severed by the blade tips; and indicating a frequency corresponding to a blade speed.

16. The method of claim 15 further comprising:

detecting an AC component in the DC current; and indicating a running clearance from an amplitude of the AC component.

17. The method of claim 16 where the step of indicating a running clearance comprises:

determining the running clearance as each resistor is severed by adding the rub depth corresponding to the severed resistor to a distance between the resistor and the reactive component.

18. The method of claim 17 further comprising:

maintaining a running clearance correlation between the amplitude of the AC component and the rub depth after the maximum rub depth is reached.

* * * * *